(12) United States Patent
Nakamura et al.

(10) Patent No.: US 10,174,441 B2
(45) Date of Patent: Jan. 8, 2019

(54) LAMINATED NONWOVEN FABRIC AND AIR PURIFIER

(71) Applicant: Panasonic Intellectual Property Management Co., Ltd., Osaka (JP)

(72) Inventors: Taichi Nakamura, Osaka (JP); Takayoshi Yamaguchi, Osaka (JP); Hiroto Sumida, Nara (JP); Takahiro Kurokawa, Tokyo (JP); Takatoshi Mitsushima, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 125 days.

(21) Appl. No.: 15/178,815

(22) Filed: Jun. 10, 2016

(65) Prior Publication Data
US 2017/0028335 A1    Feb. 2, 2017

(30) Foreign Application Priority Data
Jul. 30, 2015    (JP) .................................. 2015-150693

(51) Int. Cl.
*B01D 53/22*    (2006.01)
*D01D 5/00*    (2006.01)
(Continued)

(52) U.S. Cl.
CPC ......... *D01D 5/003* (2013.01); *B01D 39/1623* (2013.01); *B01D 39/2017* (2013.01);
(Continued)

(58) Field of Classification Search
CPC ............ B01D 39/1623; B01D 39/2017; B01D 2239/65; B01D 2239/1233;
(Continued)

(56) References Cited

U.S. PATENT DOCUMENTS 4,178,411 A * 12/1979 Cole ...................... B29C 47/54
428/451
5,447,788 A * 9/1995 Rhim ................ A61F 13/51403
428/221

(Continued)

FOREIGN PATENT DOCUMENTS

JP    2008-179916    8/2008

*Primary Examiner* — Anthony R Shumate
(74) *Attorney, Agent, or Firm* — Pearne & Gordon LLP (57) ABSTRACT

A laminated nonwoven fabric (NF) includes a first NF containing first fibers and a second NF containing second fibers and laminated on the first NF, and has a cut-off edge at an end thereof. An average diameter of the first fibers is larger than that of the second fibers not more than 3 µm. 50% by mass to 70% by mass, inclusive, of the second fibers satisfy x≥y, and 5% by mass to 30% by mass, inclusive, thereof satisfy x<y/2. "x" is a vector component in a direction (X axis direction) of the cut-off edge, and "y" is a vector component in Y axis direction perpendicular to X axis and parallel to a principal surface of the laminated NF. When the second NF is viewed from Z axis direction perpendicular to X and Y axes, at least some of the second fibers satisfying x<y/2 overlap the second fibers satisfying x≥y.

14 Claims, 4 Drawing Sheets

(51) Int. Cl.
  *B32B 5/02* (2006.01)
  *B32B 5/26* (2006.01)
  *B01D 39/16* (2006.01)
  *B01D 39/20* (2006.01)
  *B32B 5/08* (2006.01)
  *B32B 7/02* (2006.01)
  *B32B 7/12* (2006.01)

(52) U.S. Cl.
  CPC ............... *B32B 5/022* (2013.01); *B32B 5/08* (2013.01); *B32B 5/26* (2013.01); *B32B 7/02* (2013.01); *B32B 7/12* (2013.01); *B01D 2239/065* (2013.01); *B01D 2239/1233* (2013.01); *B32B 2250/02* (2013.01); *B32B 2250/20* (2013.01); *B32B 2255/02* (2013.01); *B32B 2255/26* (2013.01); *B32B 2262/0246* (2013.01); *B32B 2262/0284* (2013.01); *B32B 2262/062* (2013.01); *B32B 2262/101* (2013.01); *B32B 2262/14* (2013.01); *B32B 2307/724* (2013.01); *B32B 2307/732* (2013.01); *D01D 5/0084* (2013.01)

(58) Field of Classification Search
  CPC .............. B01D 2239/065; B32B 5/022; B32B 2255/02; B32B 2307/724; B32B 2255/26; B32B 2250/02; B32B 7/12; B32B 2250/20; B32B 2262/0246; B32B 2307/732; B32B 2262/14; B32B 5/26; B32B 2262/0284; B32B 7/02; B32B 2262/101; B32B 2262/062; B32B 5/08; D01D 5/003; D01D 5/0084
  See application file for complete search history.

(56) References Cited

U.S. PATENT DOCUMENTS

| | | | | |
|---|---|---|---|---|
| 6,723,669 | B1* | 4/2004 | Clark | D04H 3/16 442/329 |
| 2004/0242097 | A1* | 12/2004 | Hasenoehrl | A44B 18/0011 442/59 |
| 2008/0070022 | A1* | 3/2008 | Umezu | B01D 39/1623 428/220 |
| 2009/0173423 | A1* | 7/2009 | Jaffee | B32B 13/14 156/45 |
| 2010/0272938 | A1* | 10/2010 | Mitchell | D21H 13/40 428/36.1 |
| 2012/0171408 | A1* | 7/2012 | Turner et al. | B01D 39/1615 |
| 2014/0070562 | A1* | 3/2014 | Inagaki | B32B 5/022 296/180.1 |
| 2018/0065335 | A1* | 3/2018 | Lim | B32B 5/10 |

* cited by examiner

LAMINATED NONWOVEN FABRIC AND AIR PURIFIER

BACKGROUND

1. Technical Field

The present disclosure relates to a laminated nonwoven fabric, and, for example, to a laminated nonwoven fabric used for a filter medium of an air purifier.

2. Description of the Related Art

A nonwoven fabric used in an air purifier or the like is typically formed by laminating a first a nonwoven fabric and a second nonwoven fabric. The first nonwoven fabric functions as a base material or a protection material. The second nonwoven fabric contains a fiber having an average fiber diameter smaller than that of a fiber of the first nonwoven fabric, and has a dust collection function. The second nonwoven fabric containing the fiber having a small average fiber diameter may be formed by using, for example, an electrostatic spinning method. Such a nonwoven fabric is disclosed in, for example, Japanese Patent Unexamined Publication No. 2008-179916.

SUMMARY

An object of the present disclosure is to suppress peeling of a second nonwoven fabric in a laminated nonwoven fabric.

According to an aspect of the present disclosure, there is provided a laminated nonwoven fabric including a first nonwoven fabric containing first fibers; and a second nonwoven fabric containing second fibers and laminated on the first nonwoven fabric. An average fiber diameter of the second fibers is equal to or less than 3 µm, and an average fiber diameter of the first fibers is larger than the average fiber diameter of the second fibers. The laminated nonwoven fabric has a cut-off edge at an end thereof. An axis along the cut-off edge is set to X axis, an axis perpendicular to X axis and parallel to a principal surface of the laminated nonwoven fabric is set to Y axis, and an axis perpendicular to X and Y axes is set to Z axis. A vector component in a direction along X axis of the second fibers is indicated by component x, and a vector component in a direction along Y axis is indicated by component y. In this definition, 50% by mass to 70% by mass, inclusive, of the second fibers satisfy a condition of x≥y, and 5% by mass to 30% by mass, inclusive, of the second fibers satisfy a condition of x<y/2. When the second nonwoven fabric is viewed from a direction along Z axis, at least some of the second fibers satisfying the condition of x<y/2 overlap the second fibers satisfying the condition of x≥y.

According to another aspect of the present disclosure, there is provided an air purifier including a sucker of a gas; a discharger of the gas; and the laminated nonwoven fabric disposed between the sucker and the discharger.

According to the present disclosure, it is possible to suppress peeling of the second nonwoven fabric in the laminated nonwoven fabric.

DETAILED DESCRIPTION OF THE PREFERRED EMBODIMENT

Figure 1A:
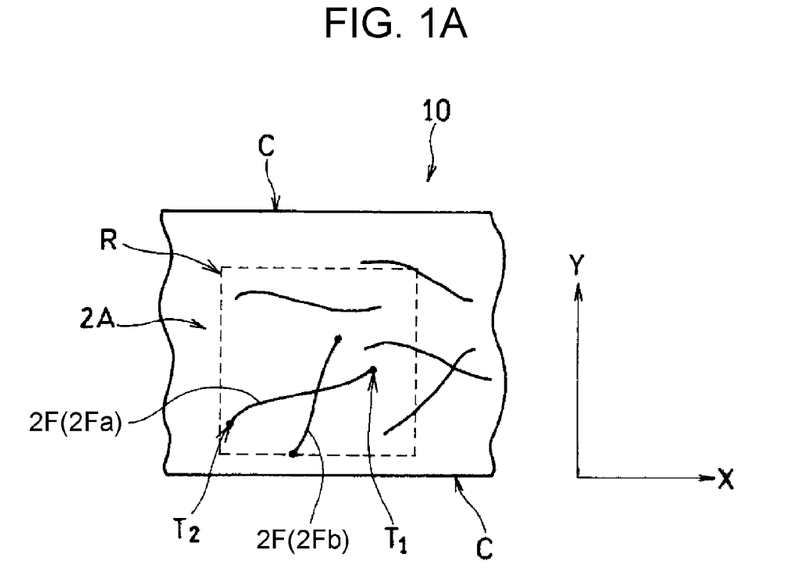
FIG. 1A is a top view schematically illustrating a laminated nonwoven fabric according to an embodiment of the present disclosure.
Figure 1B:
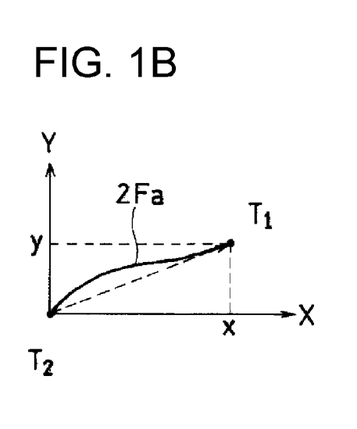
FIGS. 1B and 1C are diagrams illustrating vector components in X axis and Y axis directions of second fibers in the laminated nonwoven fabric illustrated in FIG. 1A.
Figure 1C:
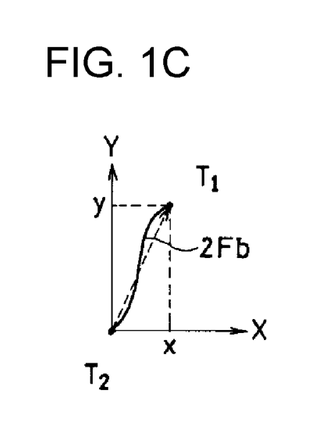
Figure 2A:
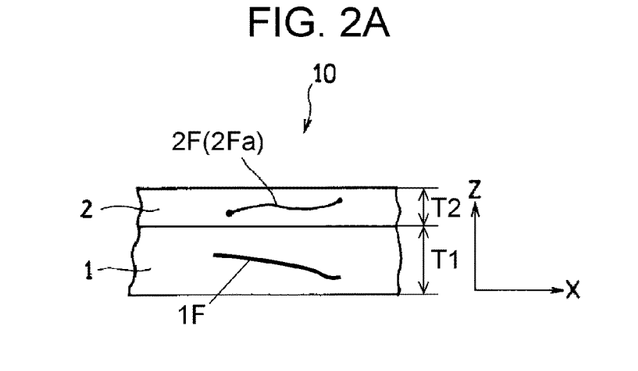
FIG. 2A is a sectional view schematically illustrating the laminated nonwoven fabric illustrated in FIG. 1A.
Figure 2B:
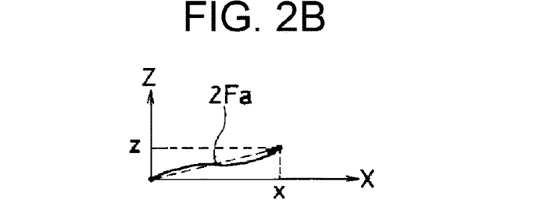
FIG. 2B is a diagram illustrating vector components in X axis and Z axis directions of the second fibers in the laminated nonwoven fabric illustrated in FIG. 2A.

Hereinafter, with reference to FIGS. 1A to 2B, laminated nonwoven fabric 10 according to an embodiment of the present disclosure will be described. FIG. 1A is a top view schematically illustrating laminated nonwoven fabric 10, and FIGS. 1B and 1C are diagrams illustrating vector components in X axis and Y axis directions of different second fibers. FIG. 2A is a sectional view schematically illustrating laminated nonwoven fabric 10, and FIG. 2B is a diagram illustrating vector components in X axis and Z axis directions of the second fibers. In FIGS. 1A and 2A, laminated nonwoven fabric 10 is illustrated as a long member but is not limited thereto.

As illustrated in FIG. 2A, laminated nonwoven fabric 10 includes first nonwoven fabric 1 containing first fibers 1F, and second nonwoven fabric 2 laminated on first nonwoven fabric 1 and containing second fibers 2F. Hereinafter, laminated nonwoven fabric 10 will be described in detail as a form appropriate for a filter medium of an air purifier, but an application of the laminated nonwoven fabric is not limited thereto.

First nonwoven fabric 1 functions as a base material for holding the shape of laminated nonwoven fabric 10. In a case of subjecting laminated nonwoven fabric 10 to pleating, first nonwoven fabric 1 works as a base material, thereby holding the shape of a pleat.

First nonwoven fabric 1 contains first fibers 1F. Materials of first fibers 1F are not particularly limited, and may include, for example, glass fibers, cellulose, acrylic resin, polypropylene (PP), polyethylene (PE), polyester (for example, polyethylene terephthalate (PET) and polybutylene terephthalate), polyamide (PA), or mixtures thereof. Above all, as materials of first fibers 1F, PET or cellulose is preferably used from the viewpoint of holding the shape. Average fiber diameter D1 of first fibers 1F is not particularly limited, and may be, for example, 1 µm to 40 µm, and may be 5 µm to 20 µm.

Average fiber diameter D1 is an average value of diameters of first fibers 1F. The diameter of the first fiber 1F is a diameter of a section perpendicular to a length direction of first fiber 1F. In a case where such a section is not circular, a maximum diameter may be considered as the diameter. A width in a direction perpendicular to the length direction of first fiber 1F when viewed from the normal direction of one principal surface of first nonwoven fabric 1 may be regarded as the diameter of first fiber 1F. Average fiber diameter D1 is an average value of diameters of, for example, any ten first fibers 1F contained in first nonwoven fabric 1 at any locations. This is also the same for average fiber diameters D2 and D3 which will be described later.

First nonwoven fabric 1 is manufactured by using, for example, a spun bonding method, a dry method (for example, an air-laid method), a wet method, a melt blow method, a needle punch method, or the like, and a manufacturing method thereof is not particularly limited. Above all, first nonwoven fabric 1 is preferably manufactured by using the wet method in that it is easy to form a nonwoven fabric appropriate for a base material.

A pressure loss of first nonwoven fabric 1 is also not particularly limited. Above all, in a case of performing measurement with a measuring machine in conformity with the regulations of JIS B9908, Form 1, an initial pressure loss of first nonwoven fabric 1 is preferably about 1 Pa to 10 Pa. As long as the initial pressure loss of the first nonwoven fabric falls within this range, a pressure loss of the whole of the laminated nonwoven fabric is also reduced. In the test method in the above-mentioned Form 1, a pressure loss is measured as follows. A filter unit having laminated nonwoven fabric 10 is held in a unit fixer without leakage of air. A static pressure measurer is attached to the filter unit. The static pressure measurer includes straight tubes sandwiching the filter unit therebetween, and the straight tubes are provided with static pressure measurement holes, respectively, perpendicular to tube walls on an upstream side and a downstream side. In this state, a blower sends wind to the filter unit in a rated air volume. The static pressure on the upstream side and that on the downstream side are measured by manometers which are connected to the static pressure measurement holes via tubes, respectively, and thus the pressure loss is obtained.

Thickness T1 of first nonwoven fabric 1 is preferably 50 μm to 500 μm, and is more preferably 150 μm to 400 μm, from the viewpoint of pressure loss. Thickness T of the nonwoven fabric is, for example, an average value of thicknesses of any ten locations in the nonwoven fabric (the same applies hereinafter). The thickness is a distance between two principal surfaces of the nonwoven fabric. Specifically, a picture of a section of the nonwoven fabric is taken, and, when a line perpendicular to one surface is drawn from any one point on one principal surface of the nonwoven fabric to the other principal surface, among fibers on the line, a distance between outsides (outward dimensions) of two fibers which are most distant from each other is obtained as thickness T of the nonwoven fabric. This is similarly performed on a plurality of any other points (for example, nine points) so that thicknesses of the nonwoven fabric are calculated, and a numerical value obtained by averaging the thicknesses is used as thickness T of the nonwoven fabric. When thickness T is calculated, an image having undergone a binarization process may be used.

Mass per unit area of first nonwoven fabric 1 is preferably 10 g/m² to 80 g/m², and is more preferably 35 g/m² to 60 g/m², from the viewpoint of pressure loss.

Second nonwoven fabric 2 contains second fibers 2F having average fiber diameter D2 smaller than average fiber diameter D1 of first fibers 1F, and has a function of capturing dust. Average fiber diameter D2 is preferably 1/10 or less of average fiber diameter D1 (D2≤D1/10), and is more preferably D2≤D1/100. As long as average fiber diameter D2 falls within this range, a pressure loss is reduced and dust collection efficiency also tends to increase. Specifically, average fiber diameter D2 is more than 0 μm and equal to or less than 3 μm. Average fiber diameter D2 is preferably equal to or less than 1 μm, and is more preferably equal to or less than 300 nm. From the viewpoint of spinnability, average fiber diameter D2 is preferably equal to or more than 30 nm, and is more preferably equal to or more than 50 nm. If average fiber diameter D2 is less than 30 nm, it is difficult to obtain a consecutively long second fiber and thus there is a case where dust collection efficiency may be rather reduced.

Second fibers 2F may include plural kinds of fibers whose average fiber diameters are different from each other. Second fibers 2F may include, for example, thin fibers whose average fiber diameter is equal to or more than 30 nm and less than 300 nm, and thick fibers whose average fiber diameter is 300 nm to 3 μm. The thick fibers and the thin fibers may be mixed into second nonwoven fabric 2, but, preferably, are respectively unevenly distributed in second nonwoven fabric 2 from the viewpoint of dust collection efficiency. For example, the thin fibers are unevenly distributed to a position close to first nonwoven fabric 1 in second nonwoven fabric 2, and thick fibers are unevenly distributed to a position close to an opposite surface thereto. An average fiber diameter of the thin fibers is preferably 1/100 or less of average fiber diameter D1 (D2≤D1/100).

Mass per unit area of second nonwoven fabric 2 is preferably 0.01 g/m² to 1.5 g/m², more preferably 0.01 g/m² to 1 g/m², and most preferably 0.03 g/m² to 0.1 g/m². As long as the mass per unit area of second nonwoven fabric 2 falls within this range, a pressure loss is reduced and high dust collection efficiency also tends to be achieved.

Materials of second fibers 2F are not particularly limited, and may include, for example, polymers such as PA, polyimide (PI), polyamideimide (PAI), polyetherimide (PEI), polyacetal (POM), polycarbonate (PC), polyether ether ketone (PEEK), polysulfone (PSF), polyethersulfone (PES), polyphenylene sulfide (PPS), polytetrafluoroethylene (PTFE), polyarylate (PAR), polyacrylonitrile (PAN), polyvinylidene fluoride (PVDF), polyvinyl alcohol (PVA), polyvinyl acetate (PVAc), PP, PET, and polyurethane (PU). These materials may be used alone or in combination of two or more kinds thereof. Above all, in a case where second fibers 2F are formed by using an electrostatic spinning method, PES is preferably used. PVDF is preferably used in that an average fiber diameter is easily reduced.

Thickness T2 of second nonwoven fabric 2 is preferably 0.5 μm to 10 μm, and is more preferably 1 μm to 5 μm, from the viewpoint of pressure loss. In a case where measurement is performed in the same condition as described above, an initial pressure loss of second nonwoven fabric 2 is preferably about 5 Pa to 40 Pa.

In a case where second nonwoven fabric 2 is formed on first nonwoven fabric 1 by using an electrostatic spinning method, for example, a raw material liquid is ejected toward first nonwoven fabric 1 from a nozzle while applying a high voltage to the raw material liquid in which a resin as a raw material of second fibers 2F is dissolved into a solvent. In a process in which the ejected raw material liquid reaches first nonwoven fabric 1, the solvent contained in the raw material liquid is vaporized, and the resin forms second fibers 2F and is accumulated on first nonwoven fabric 1. In this case, in order to uniformly accumulate second fibers 2F on first nonwoven fabric 1, second nonwoven fabric 2 is formed while first nonwoven fabric 1 as a target is conveyed. Thus, most (for example, 90% by mass or more) of second fibers 2F accumulated on first nonwoven fabric 1 are aligned in the conveyance direction of first nonwoven fabric 1.

Meanwhile, ears formed at ends of manufactured laminated nonwoven fabric 10 are typically cut out in order to make quality uniform. Second fibers 2F having the small average fiber diameter is easily entangled with a blade for the cutting. Thus, all second nonwoven fabric 2 may float from an interface with first nonwoven fabric 1 due to movement of the blade. The entanglement of second fibers 2F with the blade is reduced by cutting out second fibers 2F along alignment of second fibers 2F. As described above, electrostatic spinning is performed while first nonwoven fabric 1 is conveyed, and thus a direction (conveyance direction of laminated nonwoven fabric 10) in which the ears are cut out matches a direction in which second fibers 2F are aligned. Therefore, entanglement of second nonwoven fabric 2 hardly occurs during cutting.

On the other hand, there is a case where second nonwoven fabric 2 may be peeled off due to external factors (for example, an air flow for adjusting temperature and humidity in a manufacturing process) during conveyance of laminated nonwoven fabric 10. It is considered that peeling of second nonwoven fabric 2 is promoted due to alignment of constituent second fibers 2F. As described above, a large number of second fibers 2F formed according to the electrostatic spinning method are aligned in one direction (conveyance direction of laminated nonwoven fabric 10). Thus, if a part of second nonwoven fabric 2 floats during conveyance, second nonwoven fabric 2 is continuously peeled off in the alignment direction of second fibers 2F, that is, in the conveyance direction of laminated nonwoven fabric 10 with a floating portion as a starting point. In other words, in a case where the alignment of second fibers 2F is biased in the conveyance direction, peeling of second nonwoven fabric 2 is easily suppressed during cutting of the ears, and, on the other hand, second nonwoven fabric 2 is very easily peeled off during conveyance. Therefore, the second nonwoven fabric is easily peeled off in the laminated nonwoven fabric disclosed in Japanese Patent Unexamined Publication No. 2008-179916.

In contrast, in the present embodiment, alignment of second fibers 2F is controlled within a certain range, and thus peeling of second nonwoven fabric 2 is suppressed in during both conveyance and cutting. In other words, laminated nonwoven fabric 10 includes first nonwoven fabric 1 containing first fibers 1F, and second nonwoven fabric 2 laminated on first nonwoven fabric 1 and containing second fibers 2F. Average fiber diameter D1 of first fibers 1F and average fiber diameter D2 of second fibers 2F satisfy a relationship of D1>D2. Laminated nonwoven fabric 10 has cut-off edge C at the end thereof. Here, an axis along cut-off edge C is set to X axis, an axis perpendicular to X axis and parallel to a principal surface of laminated nonwoven fabric 10 is set to Y axis, and an axis perpendicular to X and Y axes is set to Z axis. A vector component in a direction along X axis of second fibers 2F is referred to as a component x, and a vector component in a direction along Y axis is referred to as a component y. In this definition, second fibers 2Fa with 50% by mass to 70% by mass, inclusive, of second fibers 2F satisfy a condition of and second fibers 2Fb with 5% by mass to 30% by mass, inclusive, thereof satisfy a condition of $x<y/2$. When second nonwoven fabric 2 is viewed from a direction along Z axis, at least some of second fibers 2Fb satisfying the condition of $x<y/2$ overlap second fibers 2Fa satisfying the condition of $x \geq y$.

10% by mass to 30% by mass, inclusive, of second fibers 2Fb are preferably contained in second nonwoven fabric 2, and 20% by mass to 30% by mass, inclusive, thereof are more preferably contained. With this blending ratio, peeling of second nonwoven fabric 2 during conveyance is further suppressed. On the other hand, second fibers 2Fa preferably satisfy $x \geq 2y$, and more preferably satisfy $x \geq 3y$. With this alignment, peeling of second nonwoven fabric 2 during cutting is further suppressed.

As a difference between average fiber diameter D1 and average fiber diameter D2 becomes greater, the peeling problem becomes more notable, but the alignment of the second fibers satisfies the above-described range, and thus peeling of the second nonwoven fabric during cutting is suppressed even in a case where the second fibers are considerably thin (for example, $D2 \leq D1/100$).

As illustrated in FIG. 1A, laminated nonwoven fabric 10 has cut-off edge C at the end thereof. Cut-off edge C is a trace left when first nonwoven fabric 1 and second nonwoven fabric 2 are cut in a state of being laminated. For example, in a case where laminated nonwoven fabric 10 is cut in order to remove ears of long laminated nonwoven fabric 10, cut-off edge C is formed in the length direction of laminated nonwoven fabric 10. A cutting method is not particularly limited, and cutting may be performed through shearing (slit processing). The shearing is performed by, for example, a slitter device using a rotary cutter or a straight cutter. In a case where there are a plurality of cut-off edges C in laminated nonwoven fabric 10, second fibers 2F may satisfy the following relationship with at least one cut-off edge C thereof.

Here, a coordinate system is introduced which has an axis along cut-off edge C as X axis, an axis perpendicular to X axis and parallel to the principal surface of laminated nonwoven fabric 10 as Y axis, and an axis perpendicular to X and Y axes as Z axis. Next, a vector component in a direction along X axis (X axis direction) of a long axis of second fiber 2F is referred to as a component x, and a vector component in a direction along Y axis (Y axis direction) is referred to as a component y. The long axis of second fiber 2F is regarded as a straight line (a dashed line in FIGS. 1B and 1C) connecting both ends $T_1$ and $T_2$ of second fiber 2F.

In predetermined region R illustrated in FIG. 1A, second fibers 2F are divided into second fibers 2Fa of which the component x and the component y satisfy $x \geq y$ and second fibers 2Fb of which the component x and the component y satisfy $x<y/2$. In this case, in region R, a proportion of second fibers 2Fa is 50% by mass to 70% by mass, inclusive, with respect to total mass of second fibers 2F, and a proportion of second fibers 2Fb is 5% by mass to 30% by mass, inclusive, with respect to the total mass of second fibers 2F. The proportion of second fibers 2Fb is preferably 10% by mass to 30% by mass, inclusive, and is more preferably 20% by mass to 30% by mass, inclusive.

When second nonwoven fabric 2 is viewed from a direction along Z axis, namely Z axis direction (for example, when second nonwoven fabric 2 is viewed from principal surface 2A side not facing first nonwoven fabric 1), at least some of second fibers 2Fb overlap second fibers 2Fa. In other words, at least some of second fibers 2Fb are disposed to intersect second fibers 2Fa. Thus, second fibers 2Fb can suppress second fibers 2Fa with the large proportion in second nonwoven fabric 2 from being peeled off in the alignment direction thereof. Consequently, peeling of second nonwoven fabric 2 during conveyance is suppressed. On the other hand, during cutting, even in a case where second fibers 2Fb disposed to intersect a cutting direction cling to the blade, second fibers 2Fa contained in second nonwoven fabric 2 in the high proportion and disposed in the cutting direction prevent second fibers 2Fb from floating. Consequently, peeling of second nonwoven fabric 2 during cutting is suppressed.

From the viewpoint that second nonwoven fabric 2 is easily prevented from being peeled off, a proportion of second fibers 2Fb overlapping second fibers 2Fa to all of second fibers 2Fb is preferably 5% by mass to 25% by mass, inclusive, and is more preferably 5% by mass to 15% by mass, inclusive. Second fibers 2Fa and second fibers 2Fb may or not be in contact with each other. At least some of second fibers 2Fb are preferably in contact with second fibers 2Fa in that second nonwoven fabric 2 is easily prevented from being peeled off.

Second fibers 2Fa more preferably satisfy $x \geq 2y$, and most preferably satisfy $x \geq 3y$. Since the long axis direction of second fiber 2Fa is substantially parallel to the direction of cut-off edge C, clinging of second fibers 2F to the blade during cutting is further suppressed. If a vector component in Z axis direction of second fiber 2F is set to a component z, second fibers 2Fa preferably satisfy $x > z$ (refer to FIG. 2B).

On the other hand, second fibers 2Fb more preferably satisfy $x < y/3$. Since the long axis direction of second fiber 2Fb is substantially more perpendicular to the direction of cut-off edge C, peeling of second nonwoven fabric 2 during conveyance is further suppressed. A vector component in Z axis direction of second fiber 2Fb preferably satisfies $y > z$. Vector components $(x,y,z)$ of the second fibers other than second fibers 2Fa and second fibers 2Fb contained in second nonwoven fabric 2 are not particularly limited.

For example, when second nonwoven fabric 2 is viewed from principal surface 2A, predetermined region R is a region including twenty or more second fibers 2F. Alternatively, when a picture of principal surface 2A is taken from a normal direction thereof, predetermined region R may be a region surrounded by a square whose one side has a length corresponding to about 30 times to 50 times the average fiber diameter D2 in a range of the picture.

Mass of each of second fibers 2Fa and second fibers 2Fb may be calculated by using a picture of predetermined region R taken from the normal direction of principal surface 2A. First, second fibers 2Fa and second fibers 2Fb are specified from the taken picture, and a total area of each thereof is calculated. Next, a proportion of each kind of fibers to all of second fibers 2F is calculated on the basis of each total area. In a case where specific gravities of second fibers 2Fa and second fibers 2Fb are the same as each other, a ratio of each area can be regarded as a ratio regarding mass of each kind of fibers without conversion. In a case where specific gravities of second fibers 2Fa and second fibers 2Fb are different from each other, a ratio of mass may be calculated in consideration of each specific gravity. A mass ratio of second fibers 2Fb overlapping second fibers 2Fa may be similarly calculated.

A method of controlling alignment of second fibers 2F in a certain range is not particularly limited. For example, there may be a method (first method) of applying an external force to second fibers 2F in the surface direction of first nonwoven fabric 1 until generated second fibers 2F reach first nonwoven fabric 1. Alternatively, a method (second method) of accumulating second fibers 2F on moving first nonwoven fabric 1 may be employed. The external force in the surface direction of first nonwoven fabric 1 is an external force including a component parallel to the principal surface of first nonwoven fabric 1, and such an external force may include a component perpendicular to the principal surface of first nonwoven fabric 1.

In the first method, for example, an external force in the surface direction of first nonwoven fabric 1 is applied to second fibers 2F by using a gas flow or wind power. Specifically, a gas flow in the surface direction of first nonwoven fabric 1 is made to collide with second fibers 2F on a downstream side of a space (generation space) in which second fibers 2F are generated. The downstream side of the generation space is a region closer to first nonwoven fabric 1 than a position where a raw material liquid of second fibers 2F is discharged in the generation space of second fibers 2F. For example, a gas flow is made to collide with second fibers 2F right after being generated, moving in the gravitational direction, around first nonwoven fabric 1. Consequently, lower ends of second fibers 2F first flow through the gas flow, and thus second fibers 2F are accumulated in a state of having a predetermined angle with the principal surface of first nonwoven fabric 1. If the gas flow is made to collide with second fibers 2F in a plurality of different directions, second fibers 2Fa and second fibers 2Fb with predetermined orientation can be accumulated on first nonwoven fabric 1. It is possible to control ratios of second fibers 2Fa and second fibers 2Fb by adjusting a wind amount, a wind speed, or the like of each gas flow.

In the second method, second fibers 2F are accumulated while moving first nonwoven fabric 1 in one direction (the direction of cut-off edge C) and also continuously or intermittently swinging the generation space of second fibers 2F in a direction (for example, a direction intersecting the movement direction at 90°) intersecting the movement direction. If the lower ends of second fibers 2F come into contact with moving first nonwoven fabric 1, second fibers 2F are pulled in the movement direction of first nonwoven fabric 1 due to friction between the lower ends and first nonwoven fabric 1. As a result, second fibers 2F are accumulated with predetermined orientation on first nonwoven fabric 1. At this time, it is possible to control ratios of second fibers 2Fa and second fibers 2Fb by adjusting a movement speed of first nonwoven fabric 1 in the direction of cut-off edge C, and a swing width, speed, or timing.

Ratios of second fibers 2Fa and second fibers 2Fb may be controlled by combining the first method with the second method. For example, a gas flow is made to collide with second fibers 2F from an upstream side of first nonwoven fabric 1 while moving first nonwoven fabric 1 in one direction (the direction of cut-off edge C) and also continuously or intermittently swinging the generation space of second fibers 2F in the direction intersecting the movement direction. Consequently, it is possible to increase a ratio of second fibers 2Fa and also to easily make a ratio of second fibers 2Fb from 5% by mass to 30% by mass, inclusive.

Laminated nonwoven fabric 10 can be manufactured according to a manufacturing method including the following steps (1) to (4). (1) first nonwoven fabric 1 is prepared, (2) first nonwoven fabric 1 is supplied to a conveyance belt, (3) second fibers 2F (at least second fibers 2Fa and 2Fb) are accumulated on one surface of first nonwoven fabric 1 so as to form second nonwoven fabric 2 according to an electrostatic spinning method, and (4) an obtained laminated nonwoven fabric is cut in a conveyance direction. The step (3) of forming second nonwoven fabric 2 includes the following steps (3-1) and (3-2). In step (3-1), the second fibers are generated from a raw material liquid containing a solvent and a resin raw material dissolved into the solvent in the generation space of the second fibers. In step (3-2), long axes of generated second fibers 2F are aligned in a predetermined direction, and second fibers 2Fa and 2Fb whose long axes are respectively aligned with predetermined angles with respect to the conveyance direction of first nonwoven fabric 1 are accumulated on the surface of first nonwoven fabric 1.

In the manufacturing method of the laminated nonwoven fabric, steps (1) to (3) can be performed by, for example, a manufacturing system which conveys first nonwoven fabric 1 from an upstream side of a line to a downstream side, and forms second nonwoven fabric 2 on the principal surface of conveyed first nonwoven fabric 1.

Figure 3:
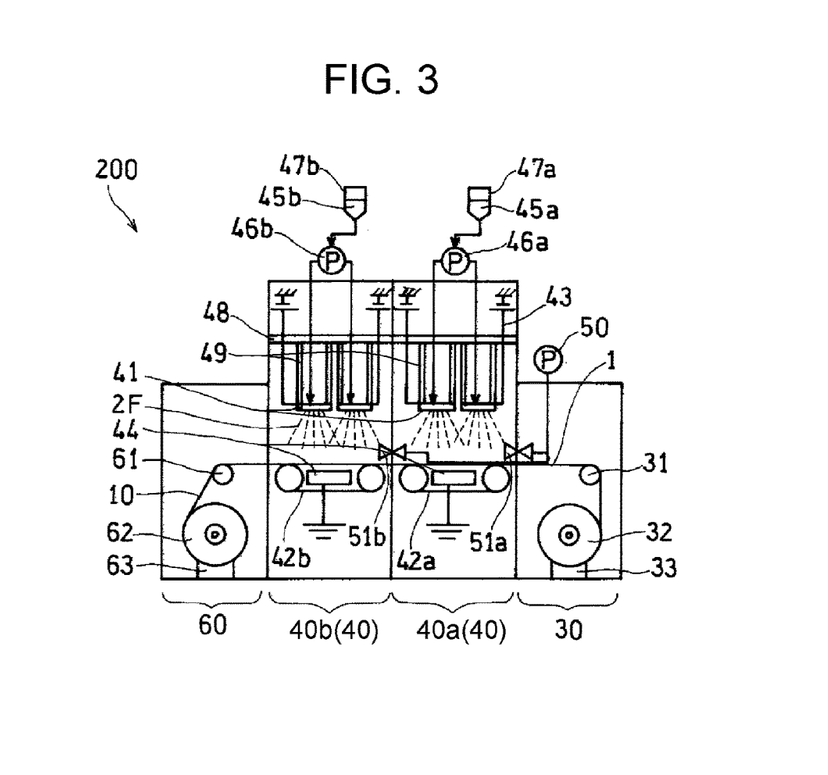
FIG. 3 is a diagram illustrating a configuration example of a part of a manufacturing system used to manufacture the laminated nonwoven fabric according to the embodiment of the present disclosure.

Hereinafter, with reference to the drawings, a description will be made of a manufacturing method of laminated nonwoven fabric 10 including steps (1) to (3) and a manufacturing system performing the method, but the following system and manufacturing method do not limit the present disclosure. FIG. 3 is a diagram schematically illustrating an example of a configuration of manufacturing system 200 of laminated nonwoven fabric 10. Manufacturing system 200 includes a manufacturing line for manufacturing laminated nonwoven fabric 10. Manufacturing system 200 includes feeding device 30 of first nonwoven fabric 1, electrostatic spinning units 40 (40a and 40b) which is a forming device of second nonwoven fabric 2, and collecting device 60. Feeding device 30 feeds first nonwoven fabric 1 to a conveyance belt (not illustrated). Electrostatic spinning units 40 include an electrostatic spinning mechanism which generates second fibers 2F from a raw material liquid by using an electrostatic force. Collecting device 60 winds thereon laminated nonwoven fabric 10 sent from electrostatic spinning units 40. Step (4) is performed by a cutting device. The cutting device cuts laminated nonwoven fabric 10 sent from the collecting device, in the sending direction of laminated nonwoven fabric 10. The cutting device may be incorporated into the manufacturing system on the downstream side, and may be disposed separately therefrom. As an example of the cutting device, there is a splitter device having a rotary cutter, a straight cutter, or the like.

Hereinafter, a description will be made of a manufacturing method using manufacturing system 200. First, first nonwoven fabric 1 is prepared. In manufacturing system 200, first nonwoven fabric 1 is conveyed from the upstream side of the manufacturing line to the downstream side thereof. Feeding device 30 which accommodates therein first nonwoven fabric 1 wound in a roll form is provided on the most upstream side of manufacturing system 200. Feeding device 30 rotates feed reel 32 with motor 33 so as to feed first nonwoven fabric 1 wound on feed reel 32 to conveyance roller 31.

First nonwoven fabric 1 is transported to electrostatic spinning unit 40a by conveyance roller 31. First nonwoven fabric 1 processed in electrostatic spinning unit 40a is transported to electrostatic spinning unit 40b. The electrostatic spinning mechanism provided in electrostatic spinning unit 40a includes discharger 41, a charger (which will be described later), and second conveyance conveyer 42a. Discharger 41 is provided on an upper side in the apparatus and discharges a raw material liquid of second fibers 2F. The charger positively charges the discharged raw material liquid. Second conveyance conveyer 42a conveys first nonwoven fabric 1 which is disposed to face discharger 41, from the upstream side to the downstream side. Second conveyance conveyer 42a functions as a collector which collects second fibers 2F along with first nonwoven fabric 1. The number of electrostatic spinning units 40 is two in FIG. 3, but is not particularly limited, and may be one or three or more.

In a case where there are a plurality of electrostatic spinning units 40, or in a case where a plurality of dischargers 41 are provided in single electrostatic spinning unit 40, an average fiber diameter of second fibers 2F to be formed may be changed for each electrostatic spinning unit 40 or for each discharger 41. The average fiber diameter of second fibers 2F may be changed by adjusting ejection pressure of a raw material liquid which will be described later, an applied voltage, concentration of the raw material liquid, a distance from discharger 41 to first nonwoven fabric 1, temperature, humidity, and the like.

A plurality of discharge outlets (not illustrated) of raw material liquid 45a are provided in discharger 41 so as to face the principal surface of first nonwoven fabric 1. Raw material liquid 45a contains a resin (raw material resin) as a raw material of second fibers 2F and a solvent dissolving the resin. Although a distance between the discharge outlet of discharger 41 and first nonwoven fabric 1 varies depending on a scale of manufacturing system 200 or a desired fiber diameter, the distance may be, for example, 100 mm to 600 mm. Discharger 41 is supported by first support 48 and second support 49 in such a manner that its own longitudinal direction is parallel to the principal surface of first nonwoven fabric 1. First support 48 is provided above second conveyance conveyer 42a, and parallel to the conveyance direction of first nonwoven fabric 1. Second support 49 extends downwardly from first support 48. First support 48 may be movable so that discharger 41 is swung in a direction perpendicular to the conveyance direction of first nonwoven fabric 1.

The charger is formed of voltage applying device 43 applying a voltage to discharger 41, and counter electrode 44 provided to be parallel to second conveyance conveyer 42a. Counter electrode 44 is grounded (connected to the ground). Consequently, a potential difference (for example, 20 kV to 200 kV) corresponding to the voltage applied by voltage applying device 43 can be caused between discharger 41 and counter electrode 44. The configuration of the charger is not particularly limited. For example, counter electrode 44 may be negatively charged. The belt portion of second conveyance conveyer 42a may be formed of a conductor instead of providing counter electrode 44.

Discharger 41 is formed of a conductor and has a long shape, and its interior is a cavity. The cavity functions as an accommodator accommodating raw material liquid 45a therein. Raw material liquid 45a is supplied from raw material liquid tank 47a to the cavity of discharger 41 by a pressure produced by pump 46a communicating with the cavity of discharger 41. Raw material liquid 45a is discharged from the discharge outlet toward the principal surface of first nonwoven fabric 1 by the pressure produced by the pump 46b. Discharged raw material liquid 45a causes electrostatic explosion to produce a fibrous material (second fibers 2F) during movement in a charged state in a space (generation space) between discharger 41 and first nonwoven fabric 1.

Air nozzle 51a communicating with air pump 50 is disposed in the generation space, and a gas is made to flow from air nozzle 51a in a predetermined direction so that second fibers 2F can be aligned in the predetermined direction and can also be accumulated on first nonwoven fabric 1. For example, in a case where the gas is made to flow from the upstream side of second conveyance conveyer 42a to the downstream side, accumulated second fibers 2F are easily aligned in the conveyance direction (length direction) of first nonwoven fabric 1. In this case, if discharger 41 is swung in a direction perpendicular to the conveyance direction, some of second fibers 2F can be aligned to intersect second fibers 2F (2Fa) aligned in the conveyance direction.

A configuration of electrostatic spinning unit 40b is the same as the configuration of electrostatic spinning unit 40a. In other words, in the same manner as electrostatic spinning unit 40a, electrostatic spinning unit 40b includes discharger 41, second conveyance conveyer 42b, voltage applying device 43, counter electrode 44, pump 46b, raw material liquid tank 47h holding raw material liquid 45b, first support 48, second support 49, and air nozzle 51b. Electrostatic spinning unit 40b performs the above-described processes on first nonwoven fabric 1 processed in electrostatic spinning unit 40a. Detailed description of electrostatic spinning unit 40b will be omitted.

A solvent contained in raw material liquid 45 of second fibers 2F may be appropriately selected depending on the kind of raw material resin or a manufacturing condition. Examples of the solvent which can be used include methanol, ethanol, 1-prop anol, 2-prop anol, hexafluoroisopropanol, tetraethylene glycol, triethylene glycol, dibenzyl alcohol, 1,3-dioxolane, 1,4-dioxane, methyl ethyl ketone, methyl isobutyl ketone, methyl n-hexyl ketone, methyl n-propyl ketone, diisopropyl ketone, diisobutyl ketone, acetone, hexafluoroacetone, phenol, formic acid, methyl formate, ethyl formate, propyl formate, methyl benzoate, ethyl benzoate, propyl benzoate, methyl acetate, ethyl acetate, propyl acetate, dimethyl phthalate, diethyl phthalate, dipropyl phthalate, methyl chloride, ethyl chloride, methylene chloride, chloroform, o-chlorotoluene, p-chlorotoluene, carbon tetrachloride, 1,1-dichloroethane, 1,2-dichloroethane, trichloroethane, dichloropropane, dibromoethane, dibromopropane, methyl bromide, ethyl bromide, propyl bromide, acetic acid, benzene, toluene, hexane, cyclohexane, cyclohexanone, cyclopentane, o-xylene, p-xylene, m-xylene, acetonitrile, tetrahydrofuran, N,N-dimethylformamide, N,N-dimethylacetamide (DMAc), dimethyl sulfoxide, pyridine, and water. These may be used alone or in combination of plural kinds thereof. Above all, as will be described later, in a case where second fibers 2F containing polyether sulfone (PES) are formed according to an electrostatic spinning method, DMAc is preferred in that the material is appropriate for the electrostatic spinning method, and PES is easily dissolved.

An inorganic solid material may be added to raw material liquid 45. Examples of the inorganic solid material may include oxides, carbides, nitrides, borides, silicides, fluorides, and sulfides. Above all, the oxides are preferably used from the viewpoint of workability or the like. Examples of the oxides may include $Al_2O_3$, $SiO_2$, $TiO_2$, $Li_2O$, $Na_2O$, MgO, CaO, SrO, BaO, $B_2O_3$, $F_2O_5$, $SnO_2$, $ZrO_2$, $K_2O$, $Cs_2O$, ZnO, $Sb_2O_3$, $As_2O_3$, $CeO_2$, $V_2O_5$, $Cr_2O_3$, MnO, $Fe_2O_3$, CoO, NiO, $Y_2O_3$, $Lu_2O_3$, $Yb_2O_3$, $HfO_2$, and $Nb_2O_5$. These may be used alone or in combination of plural kinds thereof.

A mixing ratio of the solvent and the raw material resin in raw material liquid 45 differs depending on the kind of selected solvent and the kind of raw material resin. A proportion of the solvent in the raw material liquid is, for example, 60% by mass to 95% by mass.

Laminated nonwoven fabric 10 as a laminate of first nonwoven fabric 1 and second nonwoven fabric 2 is conveyed from electrostatic spinning unit 40b. Laminated nonwoven fabric 10 is collected by collecting device 60 which is disposed on the further downstream side via conveyance roller 61. Collecting device 60 has therein collecting reel 62 for winding conveyed laminated nonwoven fabric 10 thereon. Collecting reel 62 is driven by motor 63.

A configuration of the electrostatic spinning mechanism forming second fibers 2F is not limited to the above-described configuration. As long as a mechanism can generate second fibers 2F from a raw material liquid by an electrostatic force in a predetermined generation space of second fibers 2F, and can accumulate generated second fibers 2F on the principal surface of first nonwoven fabric 1, the mechanism can be used without being particularly limited. For example, a shape of a section perpendicular to the length direction of discharger 41 may be a shape (V-shaped nozzle) which is gradually reduced from the top to the bottom.

Third Nonwoven Fabric

Figure 4:
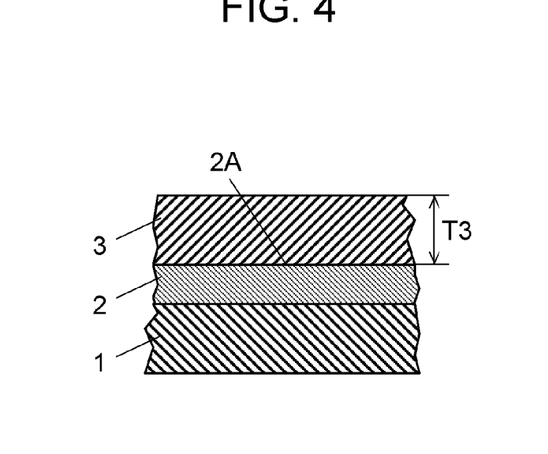
FIG. 4 is a sectional view schematically illustrating a nonwoven fabric in which a third nonwoven fabric is further laminated on the laminated nonwoven fabric illustrated in FIG. 2A.

As illustrated in FIG. 4, third nonwoven fabric 3 may be laminated on principal surface 2A of second nonwoven fabric 2 of laminated nonwoven fabric 10 manufactured in the above-described way. Third nonwoven fabric 3 functions as a protection material for protecting second nonwoven fabric 2 from various external loads. Third nonwoven fabric 3 preferably has undergone a charging process from the viewpoint of dust collection efficiency. Third nonwoven fabric 3 is adhered to principal surface 2A via an adhesive sprayed from an adhesive spraying device (not illustrated).

Third nonwoven fabric 3 contains third fibers (not illustrated). Materials of the third fibers are not particularly limited, and may include, for example, glass fibers, cellulose, acrylic resin, PP, PE, polyester such as PET, PA, or mixtures thereof. Above all, PP is preferably used in that the material is easily charged.

Average fiber diameter D3 of the third fibers is not particularly limited. Average fiber diameter D3 is, for example, 0.5 μm to 20 μm, and is preferably 5 μm to 20 μm.

A manufacturing method of third nonwoven fabric 3 is not particularly limited, and the methods exemplified in first nonwoven fabric 1 may be exemplified in the same manner. Above all, third nonwoven fabric 3 is preferably manufactured by using the melt blow method from the viewpoint that it is easy to form a nonwoven fabric having a small fiber diameter appropriate for a filter medium.

A pressure loss of third nonwoven fabric 3 is also not particularly limited Above all, in a case where measurement is performed in the same condition as described above, an initial pressure loss of third nonwoven fabric 3 is preferably about 1 Pa to 10 Pa. As long as the initial pressure loss of third nonwoven fabric 3 falls within this range, a pressure loss of the whole of laminated nonwoven fabric 10 in which third nonwoven fabric 3 is laminated is also reduced.

Thickness T3 of third nonwoven fabric 3 is preferably 100 μm to 500 μm, and is more preferably 150 μm to 400 μm, from the viewpoint of pressure loss. Mass per unit area of the third nonwoven fabric is preferably 10 $g/m^2$ to 50 $g/m^2$, and is more preferably 15 $g/m^2$ to 25 $g/m^2$, from the viewpoint of pressure loss.

Third nonwoven fabric 3 also has voids formed among the plurality of third fibers. Porosity P3 of third nonwoven fabric 3 is not particularly limited, but is preferably 60% by volume to 95% by volume, and is more preferably 70% by volume to 90% by volume, from the viewpoint of pressure loss. In the same manner as porosity P1, porosity P3 may also be calculated by using, for example, apparent mass of third nonwoven fabric 3 per unit volume and specific gravity of the third fibers.

Air Purifier

Figure 5:
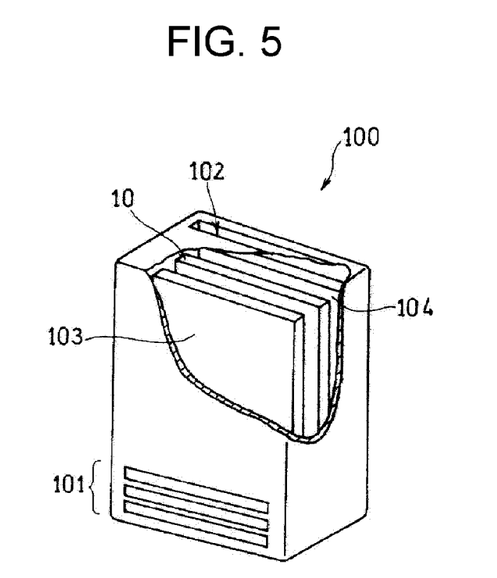
FIG. 5 is a schematic perspective view of an air purifier according to the embodiment of the present disclosure.

FIG. 5 is a schematic perspective view of air purifier 100 according to the present embodiment of the present disclosure. Air purifier 100 includes sucker 101 of a gas, discharger 102 of the gas, and laminated nonwoven fabric 10 disposed therebetween. Laminated nonwoven fabric 10 may be subjected to pleating in a pleated state and arranged. Laminated nonwoven fabric 10 is a filter medium capturing dust in the air. In air purifier 100 including laminated nonwoven fabric 10, a pressure loss is minimized for a long period of time.

From the viewpoint of dust collection efficiency, laminated nonwoven fabric 10 is preferably disposed so that principal surface 2A of second nonwoven fabric 2 (third nonwoven fabric 3 in a case where third nonwoven fabric 3 is laminated) faces sucker 101. In a case where second nonwoven fabric 2 is formed of two kinds of second fibers 2F with different thicknesses (fiber diameters), the thicker second fibers are unevenly distributed to a position close to principal surface 2A, and thus dust collection efficiency is further improved.

Air purifier 100 takes the external air from sucker 101 into the inside of air purifier 100. The taken air is subjected to dust collection during a time when the air passes through laminated nonwoven fabric 10 and the like, and the cleaned air is again discharged from discharger 102 into the outside. Air purifier 100 may further include pre-filter 103 for capturing a large dust or the like between sucker 101 and laminated nonwoven fabric 10. Air purifier 100 may include a deodorizing filter 104 or a humidifying filter (not illustrated) between laminated nonwoven fabric 10 and discharger 102.

EXAMPLES

Hereinafter, Examples of the present disclosure will be described in detail, but the present disclosure is not limited to such Examples.

Example 1

Figure 6A:
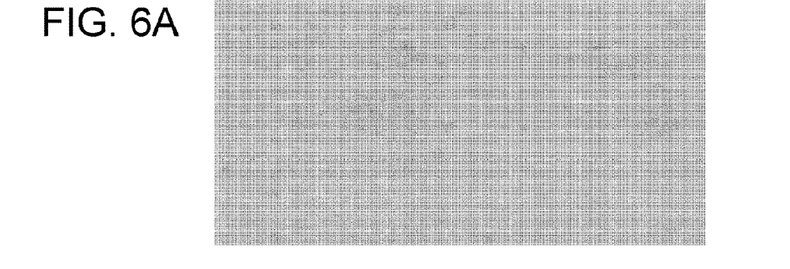
FIG. 6A is a diagram illustrating an optical microscope observation image of a surface of a second nonwoven fabric related to Example 1.
Figure 6B:
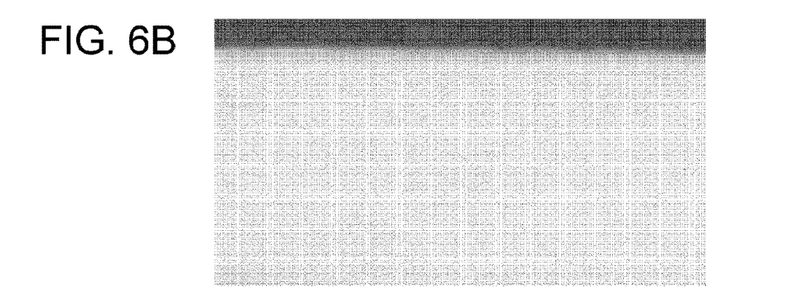
FIG. 6B is a diagram illustrating an optical microscope observation image of a cut surface of the second nonwoven fabric related to Example 1.

A base material composed mainly of cellulose (T1: 300 μm, D1: 15 μm, mass per unit volume: 42 g/m², and porosity P1: 61%) was used as the first nonwoven fabric. By using the manufacturing system illustrated in FIG. 3, the second fibers were accumulated on the conveyed first nonwoven fabric so as to form the second nonwoven fabric, and thus the laminated nonwoven fabric was manufactured. At this time, the discharger was continuously swung in a direction perpendicular to the conveyance direction, and a gas flow was also made to collide with the second fibers from the upstream side of the first nonwoven fabric in the generates space. As a raw material liquid of the second fibers, a DMAc solution containing 20% by mass of PES was used. D2 was 273 nm, and the second fibers were accumulated in an amount of 0.69 g/m² on the first nonwoven fabric. Next, the obtained laminated nonwoven fabric was cut in the length direction (conveyance direction) by using a splitter device having a rotary cutter. A cut surface and a surface of the second nonwoven fabric were checked by using optical microscope pictures, and neither peeling of the surface of the second nonwoven fabric nor peeling of the second nonwoven fabric on the cut surface was found. Optical microscope pictures (magnification of ten times) of the surface of the second nonwoven fabric and the cut surface are respectively illustrated in FIGS. 6A and 6B.

Region R of 10 μm² on the surface of the second nonwoven fabric was imaged by using an optical microscope (magnification: 10,000 times). A mass proportion of second fibers (second fibers 2Fa) whose vector components x and y satisfy x≥y to a total of the second fabric included in region R, and a mass proportion of second fibers (second fibers 2Fb) whose vector components x and y satisfy x<y/2 to the total of the second fabric included in region R, were calculated. Regarding second fibers 2Fa, a proportion of second fibers satisfying x≥2y and a proportion of second fibers satisfying x≥3y were calculated. Regarding second fibers 2Fb, a proportion of second fibers satisfying x<y/3 was calculated. Calculation results are shown in Table 1. A component z of second fibers 2Fa satisfied x>z, and a component z of second fibers 2Fb satisfied y>z. It was confirmed from the above optical microscope pictures that, in region R, 10% by mass of second fibers 2Fb satisfying x<y/2 intersected and were in contact with second fibers 2Fa satisfying x≥y.

Comparative Example 1

Figure 7A:
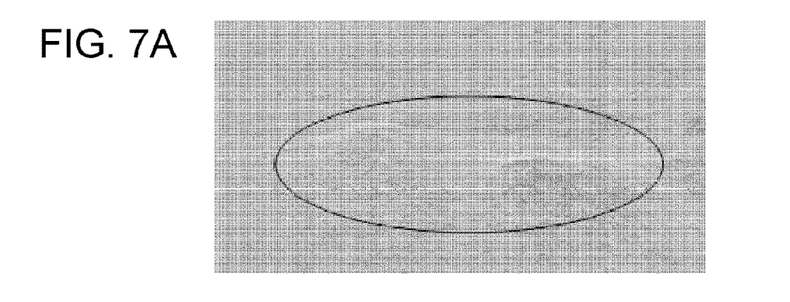
FIG. 7A is a diagram illustrating an optical microscope observation image of a surface of the second nonwoven fabric related to a comparative example 1.

The laminated nonwoven fabric was manufactured in the same manner as in Example 1 except that the discharge was not swung during formation of the second nonwoven fabric. Proportions of second fibers 2Fa and 2Fb are shown in Table 1. A cut surface of the obtained laminated nonwoven fabric and a surface of the second nonwoven fabric were checked by using an optical microscope, and floating (peeling) was observed on the surface of the second nonwoven fabric. FIG. 7A illustrates an optical microscope picture of the surface of the second nonwoven fabric. In the figure, a portion indicated by an elliptical shape is a peeling portion of the second nonwoven fabric. Peeling of the second nonwoven fabric was not observed on the cut surface.

Comparative Example 2

Figure 7B:
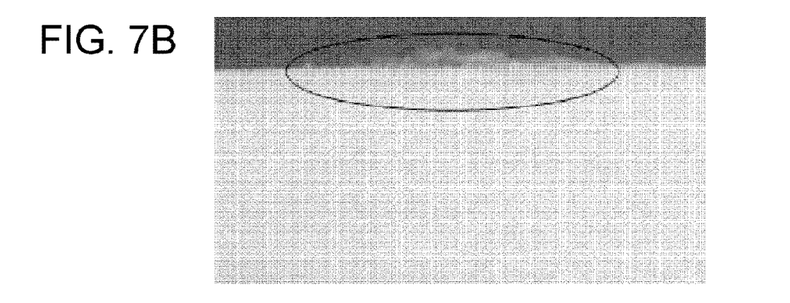
FIG. 7B is a diagram illustrating an optical microscope observation image of a cut surface of the second nonwoven fabric related to a comparative example 2.

The laminated nonwoven fabric was manufactured in the same manner as in Example 1 except that a gas flow is made to collide with the second fibers from a direction perpendicular to the conveyance direction of the first nonwoven fabric during formation of the second nonwoven fabric. Proportions of second fibers 2Fa and 2Fb are shown in Table 1. A cut surface of the obtained laminated nonwoven fabric and a surface of the second nonwoven fabric were checked by using the optical microscope, and peeling of the second nonwoven fabric was observed on the cut surface. FIG. 7B illustrates an optical microscope picture of the cut surface. In the figure, a portion indicated by an elliptical shape is a peeling portion of the second nonwoven fabric. Floating (peeling) of the second nonwoven fabric was not observed on the surface of the second nonwoven fabric.

TABLE 1

| | Proportion (% by mass) of second fibers with respect to total of second fibers | | | | |
|---|---|---|---|---|---|
| | Second fibers 2Fa | | | Second fibers 2Fb | |
| | X ≥ y | X ≥ 2y | X ≥ 3y | X < y/2 | X < y/3 |
| Example 1 | 65 | 60 | 55 | 25 | 20 |
| Comparative example 1 | 90 | 85 | 80 | 4 | 0 |
| Comparative example 2 | 40 | 30 | 20 | 50 | 40 |

As mentioned above, the laminated nonwoven fabric of the present disclosure suppresses peeling of the nonwoven fabric formed of fibers with a small average fiber diameter. Thus, the laminated nonwoven fabric of the present disclosure is appropriate for a filter medium of an air purifier or an air conditioner, a separation sheet for a battery, a membrane for a fuel cell, an extracorporeal inspection sheet such as a pregnancy test sheet, a medical sheet for cell culture, a dustproof cloth such as a dustproof mask or a dustproof wear, a cosmetic sheet, a wiping sheet for wiping dust, and the like.

What is claimed is:

1. A laminated nonwoven fabric comprising:

a first nonwoven fabric containing first fibers; and a second nonwoven fabric containing second fibers and laminated on the first nonwoven fabric, wherein an average fiber diameter of the second fibers is equal to or less than 3 µm, wherein an average fiber diameter of the first fibers is larger than the average fiber diameter of the second fibers, wherein the laminated nonwoven fabric has a cut-off edge at an end of the laminated nonwoven fabric, wherein 50% by mass to 70% by mass, inclusive, of the second fibers satisfy a condition of $x \geq y$, and 5% by mass to 30% by mass, inclusive, of the second fibers satisfy a condition of $x < y/2$, and when the second nonwoven fabric is viewed from a direction along a Z axis, at least some of the second fibers satisfying the condition of $x < y/2$ overlap the second fibers satisfying the condition of $x \geq y$, where an axis along the cut-off edge is an X axis, an axis perpendicular to the X axis and parallel to a principal surface of the laminated nonwoven fabric is a Y axis, an axis perpendicular to the X and Y axes is a Z axis, a vector component in a direction along the X axis of the second fibers is x, and a vector component in a direction along the Y axis is y.

2. The laminated nonwoven fabric according to claim 1, wherein 10% by mass to 30% by mass, inclusive, of the second fibers satisfy the condition of $x < y/2$.

3. The laminated nonwoven fabric according to claim 1, wherein 20% by mass to 30% by mass, inclusive, of the second fibers satisfy the condition of $x < y/2$.

4. The laminated nonwoven fabric according to claim 1, wherein the second fibers satisfying the condition of $x < y/2$ satisfy a condition of $x < y/3$.

5. The laminated nonwoven fabric according to claim 1, wherein the second fibers satisfying the condition of $x \geq y$ satisfy a condition of $x \geq 2y$.

6. The laminated nonwoven fabric according to claim 1, wherein the second fibers satisfying the condition of $x \geq y$ satisfy a condition of $x \geq 3y$.

7. The laminated nonwoven fabric according to claim 1, wherein the average fiber diameter of the first fibers is ten times or more the average fiber diameter of the second fibers.

8. An air purifier comprising:

a sucker of a gas;

a discharger of the gas; and the laminated nonwoven fabric according to claim 1 disposed between the sucker and the discharger.

9. The laminated nonwoven fabric according to claim 1, wherein the average fiber diameter of the second fibers being equal to or less than 1 µm.

10. The laminated nonwoven fabric according to claim 1, wherein the average fiber diameter of the second fibers is equal to or less than 300 nm.

11. The laminated nonwoven fabric according to claim 1, wherein the average fiber diameter of the second fibers is equal to or less than 1/100 of the average fiber diameter of the first fibers.

12. The laminated nonwoven fabric according to claim 1, wherein the second nonwoven fabric has a mass per unit area between 0.01 g/m² to 1.5g/m².

13. The laminated nonwoven fabric according to claim 1, wherein the first nonwoven fabric has a thickness between 50 µm and 500 µm.

14. The laminated nonwoven fabric according to claim 1, wherein the second nonwoven fabric has a thickness between 0.5 µm to 10 µm.

* * * * *